US012639181B2

(12) United States Patent
Deng et al.

(10) Patent No.: US 12,639,181 B2
(45) Date of Patent: May 26, 2026

(54) DATA WRITING METHOD AND SYSTEM, STORAGE HARD DISK, ELECTRONIC DEVICE AND STORAGE MEDIUM

(71) Applicant: Suzhou MetaBrain Intelligent Technology Co., Ltd., Suzhou (CN)

(72) Inventors: Can Deng, Suzhou (CN); Kai Zhang, Suzhou (CN); Chao Jiang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/145,969

(22) PCT Filed: Sep. 26, 2023

(86) PCT No.: PCT/CN2023/121419
§ 371 (c)(1),
(2) Date: Jul. 7, 2025

(87) PCT Pub. No.: WO2024/148856
PCT Pub. Date: Jul. 18, 2024

(65) Prior Publication Data
US 2026/0119351 A1     Apr. 30, 2026

(30) Foreign Application Priority Data

Jan. 9, 2023     (CN) .......................... 202310024308.9

(51) Int. Cl.
G06F 11/00          (2006.01)
G06F 11/1446        (2026.01)
G06F 11/20          (2006.01)

(52) U.S. Cl.
CPC ...... G06F 11/2069 (2013.01); G06F 11/1464 (2013.01); G06F 11/203 (2013.01)

(58) Field of Classification Search
CPC ............. G06F 11/2069; G06F 11/1464; G06F 11/203; G06F 11/1088; G06F 11/1092;
(Continued)

(56) References Cited

U.S. PATENT DOCUMENTS 7,587,630 B1     9/2009   Cassell et al.
12,111,728 B2 *  10/2024  Pu .......................... G06F 11/108
(Continued)

FOREIGN PATENT DOCUMENTS

CN          101571820 A      11/2009
CN          102681794 A       9/2012
(Continued)

OTHER PUBLICATIONS

International Search Report of corresponding PCT application (PCT/CN2023/121419) Dec. 29, 2023, 6 pages.
(Continued)

*Primary Examiner* — Katherine Lin
(74) *Attorney, Agent, or Firm* — COOPER LEGAL GROUP LLC

(57)          ABSTRACT

The present application relates to the technical field of data storage. Provided are a data writing method and system, and a storage hard disk, an electronic device and a storage medium. The method includes: acquiring state information of a main disk node, wherein the main disk node represents a disk node into which target storage data is to be written; if the state information indicates a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node.

20 Claims, 6 Drawing Sheets

(58) Field of Classification Search

CPC ............. G06F 11/1456; G06F 11/1466; G06F 11/1469; G06F 11/0793

See application file for complete search history.

(56) References Cited

U.S. PATENT DOCUMENTS

| | | |
|---|---|---|
| 2010/0205372 A1 | 8/2010 | Daikokuya et al. |
| 2017/0147458 A1 | 5/2017 | Epstein et al. |

FOREIGN PATENT DOCUMENTS

| | | | | |
|---|---|---|---|---|
| CN | 105357294 A | | 2/2016 | |
| CN | 107203328 A | * | 9/2017 | ............. G06F 3/064 |
| CN | 110324429 A | | 10/2019 | |
| CN | 111459399 A | | 7/2020 | |
| CN | 112579551 A | | 3/2021 | |
| CN | 112889033 A | * | 6/2021 | .......... G06F 11/2094 |
| CN | 114265728 A | | 4/2022 | |
| CN | 114281591 A | | 4/2022 | |
| CN | 114675791 A | | 6/2022 | |
| CN | 115826876 A | | 3/2023 | |

OTHER PUBLICATIONS

Written Opinion of International Searching Authority of corresponding PCT application (PCT/CN2023/121419) Dec. 29, 2023, 8 pages.

First Office Action of corresponding CN priority application (CN202310024308.9) Mar. 30, 2023, 11 pages.

Notification to Grant Patent Right for Invention of corresponding CN priority application (CN202310024308.9) Apr. 12, 2023, 3 pages.

* cited by examiner

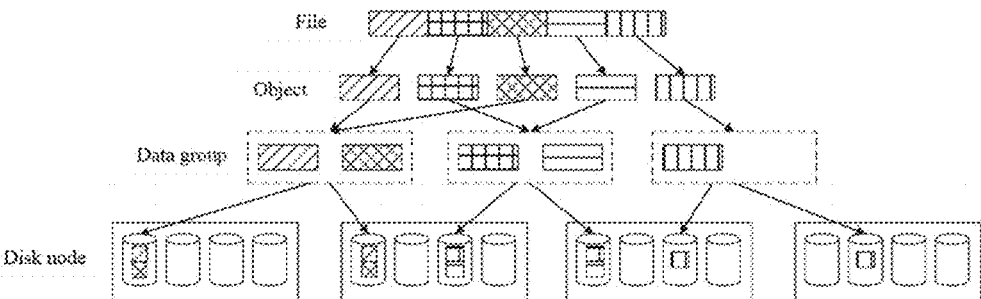

FIG. 1

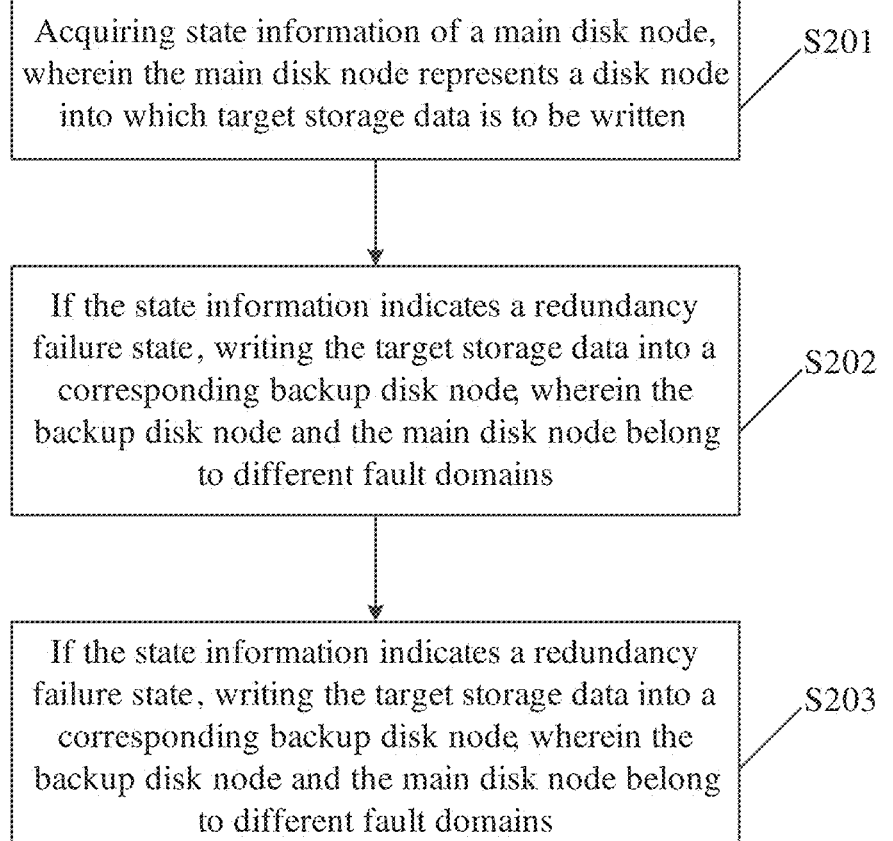

Acquiring state information of a main disk node, wherein the main disk node represents a disk node into which target storage data is to be written ⟋S201

If the state information indicates a redundancy failure state, writing the target storage data into a corresponding backup disk node, wherein the backup disk node and the main disk node belong to different fault domains ⟋S202

If the state information indicates a redundancy failure state, writing the target storage data into a corresponding backup disk node, wherein the backup disk node and the main disk node belong to different fault domains ⟋S203

FIG. 2

| Device application | Camera lower international platform | Third-party application platform | Upper international platform | Client UI application | Management, operation and maintenance |
|---|---|---|---|---|---|

| | Protocol component 1 Device management Device component o | Standard protocol gateway | External IDK | Operation & maintenance system support services |
|---|---|---|---|---|
| Video management platform | Business services (video planning, streaming object input, channel management, etc.) | | | |
| | Service session management (configuration, authorization, events, logs) | | | |
| | Basic service components (view analysis, real-time retrieval, job tasks) | | | |

| | Distributed storage cluster (monitoring component, reading/writing component) |
|---|---|
| Base layer | Host    OS |
| | Hardware layer (M36, M60) |

FIG. 8

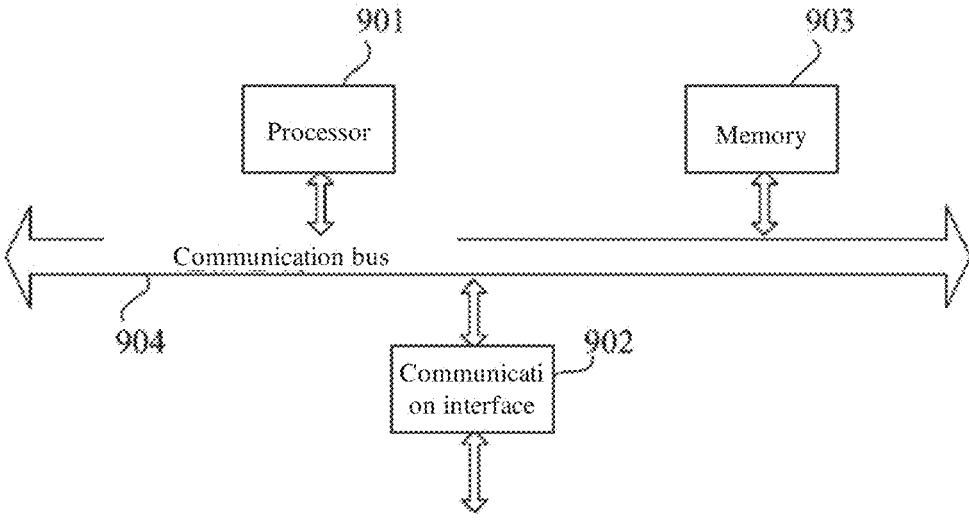

FIG. 9

DATA WRITING METHOD AND SYSTEM, STORAGE HARD DISK, ELECTRONIC DEVICE AND STORAGE MEDIUM

CROSS-REFERENCE TO RELATED APPLICATION

The present application claims priority to the Chinese Patent Application No. 202310024308.9, filed on Jan. 9, 2023 with the China National Intellectual Property Administration and entitled "Data Writing Method and System, Storage Hard Disk, Electronic Device and Storage Medium", which is incorporated herein by reference in its entirety.

FIELD

The present application relates to the technical field of data storage, in particular to a data writing method and system, a storage hard disk, an electronic device and a storage medium.

BACKGROUND

With the application of technologies such as the $5^{th}$ generation mobile communication technology (5G), artificial intelligence (AI), and big data, the demands for Safe City, Smart Transportation, Smart Medical Care and Smart Education, which are based on AI security, continue to grow, prompting video surveillance devices to become intelligent, while also posing new challenges to video storage that carries video AI analysis.

Distributed video storage systems can establish a stable and high-performance foundation for video access, aggregation, storage and networking to assist upper-level service platforms (including video service platforms and data service platforms) and AI computing services. The requirements of distributed video storage for reliability include three points: no loss in video recordings, data recovery in a redundancy mode, and readability and writability for residual disks after redundancy failure. Existing distributed storage systems often meet the requirements for no loss in video recordings and data recovery in a redundancy mode, but the degree of redundancy needs to be improved to achieve the readability and writability for residual disks after redundancy failure. However, the disadvantage of this method is that the utilization rate of an effective storage capacity and the storage space are both reduced.

Therefore, it is now urgent to provide a data writing method and system, a storage hard disk, an electronic device and a storage medium to solve the above problems.

SUMMARY

In view of the problems existing in the prior art, the present application provides a data writing method and system, and a storage hard disk, an electronic device and a storage medium.

The present application provides a data writing method. The writing method includes:

acquiring state information of a main disk node, wherein the main disk node represents a disk node into which target storage data is to be written;

if the state information indicates a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node.

According to a data writing method provided by the present application, prior to acquiring the state information of the main disk node, the method further includes:

determining a plurality of corresponding first fault domains from all disk nodes according to a preset redundant replica count and preset data groups, wherein the first fault domains are main disk nodes into which object blocks are to be written; the object blocks are obtained by splitting the target storage data based on the preset data groups;

acquiring a plurality of second fault domains, and constructing a mapping relationship of one-to-one correspondence between the first fault domains and the second fault domains by using the disk nodes corresponding to the second fault domains as backup disk nodes; and generating a data groups list according to the mapping relationship, wherein the first fault domain and the second fault domain in each data packet in the data groups list are different fault domains; and prior to writing the target storage data into the corresponding backup disk node, the method further includes:

determining the corresponding backup disk node according to the data groups list when the main disk node is in a redundancy failure state.

According to a data writing method provided by the present application, after acquiring the state information of the main disk node, the method further includes:

acquiring state information of fault domains, wherein the state information of the fault domains represents state information of all fault domains corresponding to the main disk node;

determining the number of fault disk nodes in each of the data packets at the current time according to the state information of the fault domains; and determining that the data packets are in the redundancy failure state in a case where the number of fault disk nodes is greater than a preset fault threshold.

According to a data writing method provided by the present application, the method further includes:

determining that the data packets are in a to-be-degraded state in a case where the number of fault disk nodes is less than or equal to the preset fault threshold; and adjusting the data groups list in the to-be-degraded state based on the disk nodes where no fault occurs currently.

According to a data writing method provided by the present application, the method further includes:

in response to the number of fault disk nodes being zero, determining that the data packets are in a normal state, and writing the target storage data to the main disk node.

According to a data writing method provided by the present application, after adjusting the data groups list in the to-be-degraded state based on the disk nodes where no fault occurs currently, the method further includes:

writing the target storage data into the main disk node in the adjusted data groups list.

According to a data writing method provided by the present application, the acquiring the plurality of second fault domains, and constructing the mapping relationship of one-to-one correspondence between the first fault domains and the second fault domains by using the disk nodes corresponding to the second fault domains as backup disk nodes, include:

determining a block storage mapping relationship through a HASH algorithm, wherein the block storage mapping relationship represents a mapping relationship between each object block in the target storage data and a corresponding target fault domain, and the target fault domain represents a first fault domain into which the object block is to be written; and acquiring the plurality of second fault domains from all disk nodes according to the block storage mapping relationship, and associating the target fault domains with the second fault domains, which are different from each other, to construct the mapping relationship.

According to a data writing method provided by the present application, the generating the data groups list according to the mapping relationship includes:

marking the disk nodes corresponding to the first fault domains as the main disk nodes according to the mapping relationship, and marking the disk nodes corresponding to the second fault domains as the backup disk nodes;

constructing a main disk list and a backup disk list based on identifier information respectively corresponding to the main disk nodes and the backup disk nodes; and generating the data groups list according to the main disk list and the backup disk list.

According to a data writing method provided by the present application, the adjusting the data groups list in the to-be-degraded state based on the disk nodes where no fault occurs currently includes:

determining the disk nodes where no fault occurs currently according to the change in the number of disks in the main disk node at the current time;

adjusting the data groups list based on a data migration minimization principle and according to the number of redundant replicas and the disk nodes where no fault occurs, to obtain the adjusted data groups list; and determining a new data groups list according to the adjusted data groups list and an original data groups list, wherein the original data groups list represents a data groups list before the current adjustment round has been performed.

According to a data writing method provided by the present application, the determining the new data groups list according to the adjusted data groups list and the original data groups list includes:

if the identifier information of the main disk nodes exists in the main disk list in the original data groups list, determining that the identifier information of the main disk nodes is added to a new main disk list, wherein the new main disk list represents the main disk list in the adjusted data groups list;

if the identifier information of the main disk nodes does not exist in the main disk list in the original data groups list, determining that the identifier information of the main disk nodes is added to a new backup disk list, wherein the new backup disk list represents the backup disk list in the adjusted data groups list; and generating a new data groups list according to the new main disk list and the new backup disk list.

According to a data writing method provided by the present application, the generating the new data groups list according to the new main disk list and the new backup disk list includes:

in a case where the number of disks in the new main disk list is less than the preset redundant replica count, adding the identifier information corresponding to the disk nodes in the new backup disk list to the new main disk list; and in a case where the number of disks in the new main disk list is equal to the preset redundant replica count, determining that the data groups list has been adjusted to obtain the new data groups list.

According to a data writing method provided by the present application, the associating the target fault domains with the second fault domains, which are different from each other, to construct the mapping relationship includes:

determining a minimum number of replicas corresponding to the backup disk nodes based on the preset redundant replica count and a preset redundancy mode; and associating the second fault domains corresponding to the minimum number of replicas with the target fault domains.

According to a data writing method provided by the present application, prior to acquiring the state information of the main disk node, the method further includes:

constructing a disk node writing tag, wherein a value of the disk node writing tag includes writing storage data into the main disk node and writing the storage data into the backup disk node; and after acquiring the state information of the main disk node, the method further includes:

updating the value of the disk node writing tag according to the state information, and thus writing the target storage data into the corresponding disk node according to the updated disk node writing tag; and reading the storage data from the corresponding disk node according to the updated disk node writing tag.

According to a data writing method provided by the present application, after copying to the main disk node the target storage data, which has been stored in the backup disk node, the method further includes:

deleting the target storage data which has been stored in the backup disk node.

According to a data writing method provided by the present application, after deleting the target storage data which has been stored in the backup disk node, the method includes:

acquiring a transfer duration of backup disk data, wherein the transfer duration of backup disk data represents a duration after the target storage data which has been stored in the backup disk node is copied to the main disk node; and deleting the target storage data which has been stored in the backup disk node after the transfer duration of backup disk data is greater than or equal to a preset deletion duration of backup data.

According to a data writing method provided by the present application, after writing the target storage data into the corresponding backup disk node if the state information indicates the redundancy failure state, the method further includes:

receiving a first input, wherein the first input includes an operation of reading the target storage data from the backup disk node when it is determined that the state information indicates the redundancy failure state; and acquiring the target storage data which has been stored in the backup disk node in response to the first input.

The present application further provides a data writing system. The data writing system includes:

a disk state acquisition module, configured to acquire state information of a main disk node, wherein the main disk node represents a disk node into which target storage data is to be written;

a backup disk writing module, configured to, if the state information indicates a redundancy failure state, write the target storage data into a corresponding backup disk node, wherein the backup disk node and the main disk node belong to different fault domains; and a data recovery module, configured to, after it is determined that the state information of the main disk node indicates a normal state, copy to the main disk node the target storage data, which has been stored in the backup disk node.

The present application further provides a storage hard disk, which includes the data writing system described above.

The present application further provides an electronic device. The electronic device includes a memory, a processor and a computer program that is stored in the memory and operable on the processor, wherein the processor is configured to implement any of the data writing methods described above when executing the program.

The present application further provides a non-transient computer-readable storage medium configured to have a computer program stored thereon, wherein the computer program, when being executed by a processor, implements any of the data writing methods described above.

The data writing method and system, the storage hard disk, the electronic device and the storage medium provided by the present application can ensure that new video data can still be continuously written and read in a scenario where a fault occurs in a storage node and leads to a redundancy failure, and the number of redundancy fault nodes is increased without reducing the utilization rate of an effective storage capacity, thereby greatly improving the availability of video storage in a fault scenario, ensuring that the residual disk can still be read and written after redundancy failure, and meeting the requirement of services for continuous writing in a video storage scenario.

BRIEF DESCRIPTION OF THE DRAWINGS

To describe the technical solutions in the present application or in the prior art more clearly, the following briefly introduces the accompanying drawings required for describing the embodiments or the descriptions in the prior art. Apparently, the accompanying drawings in the following description show merely some embodiments of the present application, and a person of ordinary skill in the art may still derive other drawings from these accompanying drawings without creative efforts.

FIG. 1 is a schematic diagram of a data storage process in the prior art;

FIG. 2 is a schematic flowchart of a data writing method provided by the present application;

FIG. 8 is a schematic diagram of a video storage architecture provided by the present application; and FIG. 9 is a schematic structural diagram of an electronic device provided by the present application.

DETAILED DESCRIPTION

Figure 3:
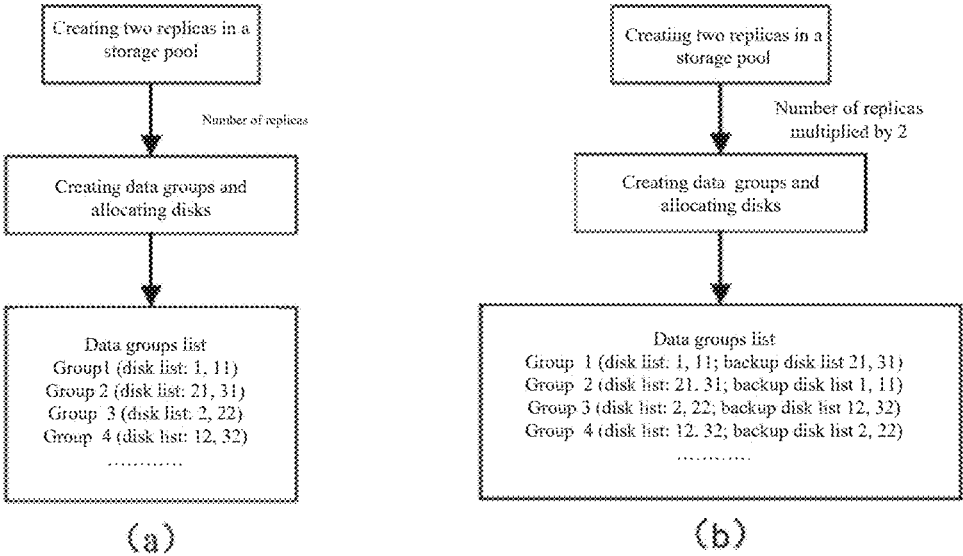
FIG. 3 is a schematic diagram of the comparison between main and backup disk data groups lists provided in the present application and the existing data groups list.

In order to make the objectives, technical solutions and advantages of the present application more clear, the technical solutions in the present application will be described clearly and completely below in conjunction with the accompanying drawings in the present application. Apparently, the described embodiments are merely some embodiments, rather than all embodiments, of the present application. Based on the embodiments in the present application, all other embodiments derived by a person of ordinary skill in the art without creative efforts shall fall within the protection scope of the present application.

In order to improve the data reading/writing efficiency, a distributed storage system often partitions data to be stored into objects of uniform size, and then stores the objects in a plurality of storage disks according to the number of redundant replicas. In order to facilitate unified management for these replicas of the same object, data groups are introduced for management. FIG. 1 is a schematic diagram of a data storage process in the prior art. Referring to FIG. 1, after a file is written, this file is first split into a plurality of objects. Then, each object is partitioned into a corresponding data group, or the plurality of objects may be partitioned into the same data group. Each data group corresponds to a storage disk having a certain number of redundant data, and whereby the writing storage of files as the number of replicas is also achieved. Each object may be fixedly mapped into one data group. Therefore, in the event of looking for an object, it is only necessary to find the data group to which the object belongs, and then traverse this data group, rather than all objects. In addition, the data group may also be migrated as a basic unit during data migration.

The existing distributed storage cluster generally uses a redundancy mode of replica or erasure to ensure the consistency and reliability of data in a fault scenario, implement the fault detection and recovery through a monitoring component, and also ensure the data consistency by means of migration and balance of data among nodes in the cluster. In some embodiments, the monitoring component tracks a health state of the entire cluster through a series of Map files. All nodes in the cluster report the state to a monitoring node and share information on each state change. For example, cluster Map stores node information of the cluster, a data disk Map stores disk information of a storage node, and a data group Map stores a data disk corresponding to the data group, a state of the data group, etc. The information on storage devices in the cluster is stored in the Map files, and a fault domain hierarchy defines rules for how to store data in fault domains.

When a distributed storage cluster is initialized, a storage pool is established first to store logical partitions of files. Each pool contains a certain number of data groups. Disks with the corresponding number of replicas are allocated in each data group to ensure that in a scenario of different fault domains (three-replica node fault domains), one data group in each disk will be mapped to three data disks of three different disk nodes, and the information on these disks is stored in a disk list of the Map files in the data group to ensure the reliability of data replicas. When the cluster receives a request from a client, by writing ID information of the files, data groups into which a plurality of objects after the file is partitioned into blocks need to be stored are calculated through hash. Then, these objects are stored into a first disk in the disk list of the data group. When the number of configured replicas is greater than 1, the replicas are copied to disks in other fault areas in the data group, and whereby the files can be subjected to distributed storage in a redundancy mode. A monitoring component monitors the state of each disk node. If a fault occurs in a disk or node when data is written, the state of the data group where the fault disk is located is updated. If the fault disk is not recovered beyond a certain period of time, another disk may be selected for the data group to join (this disk is a redundant disk). If a fault occurs in all disks (e.g., a two-replica fault domain or a three-replica fault domain), this data group can no longer be read or written, and all files mapped to this data group through hash can no longer be read or written, resulting in the failure to store the current and upcoming recordings in a video storage scenario and never retrieval, which shows the importance of continuous writing for services in the video storage scenario.

The existing distributed storage method can improve the degree of redundancy of faults through the number of replicas in a replica mode or in an erasure mode, so as to ensure the continuous data reading/writing for services. However, regardless of the replica mode or the erasure mode, it is necessary to sacrifice a certain utilization rate of an effective capacity. For example, in the case of four disk nodes with two replicas (10 1T disks/node), the effective capacity is 20 T, the utilization rate of the effective capacity is 50%, and a fault may occur in a maximum of one disk node. If it is necessary to support the simultaneous failure of two nodes, the degree of redundancy (e.g., three replicas) needs to be improved, the actual effective capacity is reduced to 13.3 T, and the utilization rate of the effective capacity is 33%, which is reduced by 17%. However, in a video storage service, a large amount of video data is generated every day, so the cost of improving the reliability of the data by increasing the number of replicas will be huge.

In view of the problems existing in the existing distributed video storage, on the basis of a distributed video storage technology, the present application proposes a method for setting backup disk nodes for a storage disk in a data group. Under a certain utilization rate of an effective capacity, this method ensures that, after a data disk in the data group is beyond a fault domain (i.e., the redundancy fails), the video data at the current moment can be continuously written for storage, and the written data can be read and written normally.

FIG. 2 is a schematic flowchart of a data writing method provided by the present application. As shown in FIG. 2, the present application provides a data writing method and includes:

step 201: acquiring state information of a main disk node, wherein the main disk node represents a disk node into which target storage data is to be written.

In the present application, it is necessary to add a backup disk list to a Map file in a data group to save disk information of backup disk nodes. Meanwhile, a backFlag tag is added to metadata to record whether the data is written into a main disk node list or a backup disk node list. The backFlag tag is marked as "false" by default, representing the data being written into the main disk node list. The present application is described with a storage pool in which four nodes with two replica nodes are set as fault domains. The data disks in the disk node 1 are represented by 1 to 10 (i.e., the data disk 1, the data disk 2, . . . , the data disk 10). The data disks in the disk node 2 are represented by 11 to 20 (i.e., the data disk 11, the data disk 12, . . . , the data disk 20). The data disks in the disk node 3 are represented by 21 to 30 (i.e., the data disk 21, the data disk 22, . . . , the data disk 30). The data disks in the disk node 4 are represented by 31 to 40 (i.e., the data disk 31, the data disk 32, . . . , the data disk 40). In the present application, a storage pool in a distributed storage cluster is in a redundancy mode. That is, a corresponding number of fault domains are set according to a preset number of replicas, and data is written into main disk nodes when the disk state indicates no fault or the number of fault disks does not exceed a minimum number of replicas. Therefore, in the present application, when video data is written, it is necessary to acquire the state information of the main disk node at the current time, so as to determine whether the video data needs to be written into the main disk node or a backup disk node.

Step 202: if the state information indicates a redundancy failure state, writing the target storage data into a corresponding backup disk node, wherein the backup disk node and the main disk node belong to different fault domains.

In the present application, if the state of each disk in the data group is normal, the state of the data group is normal; and if a fault occurs in some disks in the data group and is not beyond the fault domain (e.g., there is at least one replica left in a replica mode scenario and at least two replicas left in an erasure 2+1 mode), the state of the data group is a degraded state; and if the disk is beyond the fault domain, the state of the data group is an abnormal state, that is, a redundancy failure state. In the present application, when all corresponding main disk nodes in the data group are in both normal and degraded states, data can be directly written into the corresponding disk nodes in the main disk list. In this case, no data is written into the backup disk list, and whereby the utilization rate of an effective capacity cannot be reduced.

Further, if the main disk node is determined as in the redundancy failure state, it means that data cannot be written into the main disk node. In this case, all fault domains go wrong, so data needs to be written into the corresponding backup disk node. It needs to be noted that, in the present application, the main disk node and the backup disk node are set according to the fault domains, i.e., to ensure that the main disk node and the backup disk node into which data is to be written belong to different fault domains. That is, each disk node may be either the main disk node or the backup disk node. For example, in the case of two replicas, the main disk nodes of data A are a data disk 1 and a data disk 11, and the backup disk nodes are a data disk 21 and a data disk 31. That is, in a normal state, the data A will be written to the disk node 1 and the disk node 2. In the case of redundancy failure, that is, when a fault occurs in the disk node 1 and the disk node 2, the data A is temporarily written into a disk node 3 and a disk node 4. The main disk nodes of data B are a data disk 21 and a data disk 31, and the backup disk nodes are a data disk 1 and a data disk 11. That is, in the normal state, the data B will be written into the disk node 3 and the disk node 4. In the case of redundancy failure, that is, when a fault occurs in the disk node 3 and the disk node 4, the data B is temporarily written into the disk node 1 and the disk node 2.

Step 203: after it is determined that the state information of the main disk node indicates a normal state, copying to the main disk node the target storage data, which has been stored in the backup disk node.

In the present application, the data is written to a disk node in the backup disk list for data reading/writing only if a redundancy failure occurs in a disk node in a data group state. In addition, after the disk nodes in the main disk list recover, the data in the backup disk node needs to be migrated back to the corresponding main disk node.

The data writing method provided by the present application can ensure that new video data can still be continuously written and read in a scenario where a fault occurs in a storage node and leads to a redundancy failure, and the number of redundancy fault nodes is increased without reducing the utilization rate of an effective storage capacity, thereby greatly improving the availability of video storage in a fault scenario, ensuring that the residual disk can still be read and written after redundancy failure, and meeting the requirement of services for continuous writing in a video storage scenario.

Based on the above embodiment, prior to acquiring the state information of the main disk node, the method further includes:

determining a plurality of corresponding first fault domains from all disk nodes according to a preset redundant replica count and preset data groups, wherein the first fault domains are main disk nodes into which object blocks are to be written; the object blocks are obtained by splitting the target storage data based on the preset data groups;

acquiring a plurality of second fault domains, and constructing a mapping relationship of one-to-one correspondence between the first fault domains and the second fault domains by using the disk nodes corresponding to the second fault domains as backup disk nodes; and generating a data groups list according to the mapping relationship, wherein the first fault domain and the second fault domain in each data packet in the data groups list are different fault domains; and prior to writing the target storage data into the corresponding backup disk node, the method further includes:

determining the corresponding backup disk node according to the data groups list when the main disk node is in a redundancy failure state.

In the present application, a storage pool is created first based on a preset redundant replica count and preset data groups. In some embodiments, a certain number of data packets are created by a monitoring component, and a disk allocation algorithm is invoked according to the number of replicas (e.g., two replicas). Thus, the disk nodes corresponding to the data packets are calculated by using the disk allocation algorithm according to the number of nodes in the cluster, as well as the number and capacities of disks on the nodes, etc., to ensure that the disks in the data packets are allocated to nodes in different fault domains. In the present application, since a main disk list and a stand disk list need to be constructed, the number of replicas to be passed needs to be the number of original replicas multiplied by 2. FIG. 3 is a schematic diagram of the comparison between main and backup disk data groups lists provided in the present application and the existing data groups list, wherein (a) in FIG. 3 is the existing disk allocation list, and (b) in FIG. 3 is a disk allocation list provided in the present application. Referring to FIG. 3, compared with the data group list in the prior art, the present application further creates the backup disk list, leading to the increase in the number of replicas. However, these additional replicas do not affect the utilization rate of an effective capacity, and the backup disk nodes are used only in the case of redundancy failure. It needs to be noted that the constraint in the present application for setting the backup disk nodes is as follows: after the main disk nodes are allocated, the backup disk nodes selected from the remaining number of disks in the fault domains (that is, disk nodes that belong to different fault domains from the main disk nodes) need to meet a minimum number of redundant replicas. For example, in a two-replica mode, after the main disks in nodes in two fault domains are determined, at least one backup disk node is required. In an erasure 2+1 mode scenario, after three main disk nodes are selected, at least two secondary disk nodes need to be selected to ensure that the backup disk list can meet the data reading/writing requirements of the fault domains in a case where the original redundancy scenario fails. Referring to (b) in FIG. 3, taking four disk nodes with two replicas as an example, the disk list of each data packet is calculated through the disk allocation algorithm, and then the number of replicas of disk nodes is preferentially allocated to the main disk list (two disk nodes are allocated, and the two disk nodes also belong to different fault domains). Finally, the data disks are selected from the remaining disk nodes according to the fault domains of the disk nodes selected from the main disk list, to ensure that the backup disk node and the main disk node also belong to different fault domains, thereby constructing the backup disk list.

Based on the above embodiment, after acquiring the state information of the main disk node, the method further includes:

acquiring state information of fault domains, wherein the state information of the fault domains represents state information of all fault domains corresponding to the main disk node;

determining the number of fault disk nodes in each of the data packets at the current time according to the state information of the fault domains; and determining that the data packets are in the redundancy failure state in a case where the number of fault disk nodes is greater than a preset fault threshold.

In the present application, when video data needs to be stored and written, the monitoring component monitors the state information of each disk node to acquire in real time whether the number of fault disks in the main disk node exceeds the preset fault threshold. In the present application, the preset fault threshold is set according to the number of fault domains. For example, if a fault occurs in a node and does not lead to redundancy failure, there is at least one replica left in a replica mode scenario (e.g., in a case of three replicas, a fault occurs in at most two disk nodes, and then a default fault threshold is 2, that is, when the number of fault disk nodes in three fault domains in the main disk node exceeds two, the main disk node into which a data packet is to be written is in the redundancy failure state) and at least two replicas left in an erasure 2+1 mode scenario.

Based on the above embodiments, the method further includes:

determining that the data packets are in a to-be-degraded state in a case where the number of fault disk nodes is less than or equal to the preset fault threshold; and adjusting the data groups list in the to-be-degraded state based on the disk nodes where no fault occurs currently.

In the present application, in a case where there are fault nodes in the main disk node and the number of fault nodes is not beyond the fault domains (that is, less than or equal to the preset fault threshold), the data usage capacities of each disk node and each data packet will be different, and the disk list (that is, the data groups list) in each data packet needs to be adjusted through an equalization mechanism of a distributed storage system to ensure the capacity equalization between each node and each data packet. In the present application, the change in disks in the storage pool is detected by the monitoring component, and the equalization mechanism is then enabled to reallocate disk members in each data packet. In the process of adjusting the disk members in the data packet, it is also necessary to adjust members in the backup disk list synchronously. It should be noted that the data groups list may also be adjusted after capacity expansion, capacity shrinkage and other operations for the storage pool.

Based on the above embodiments, the method further includes:

in response to the number of fault disk nodes being zero, determining that the data packets are in a normal state, and writing the target storage data to the main disk node.

In the present application, when the monitoring component detects that all the current main disk nodes operate normally without a fault, video data can be directly written into the main disk node, while the backup disk node will not be enabled in the normal state, ensuring the utilization rate of an effective capacity. The video data is written into the backup disk node only when it is determined that there is a redundancy failure state in the data packet. Meanwhile, the data packet corresponding to the main disk node is also marked as the redundancy failure state (the abnormal state), and a process is started to parse metadata on the corresponding data packet and mark the data written before the abnormal state as "unreadable".

Based on the above embodiments, after adjusting the data groups list in the to-be-degraded state based on the disk nodes where no fault occurs currently, the method further includes:

writing the target storage data into the main disk node in the adjusted data groups list.

In the present application, for a data group degradation scenario, if the storage pool undergoes capacity expansion, capacity shrinkage or node failure (not exceeding the number of the fault domains), the data usage capacities of each disk node and each data packet will be different. After the disk list in each data packet is adjusted through the equalization mechanism of the distributed storage system, the acquired video data (i.e., the target storage data) is written into the main disk node in the adjusted data groups list according to the adjusted data groups list. The data can be written through the real-time updated data groups list, and whereby the disk storage space is more equalized.

Based on the above embodiments, the acquiring the plurality of second fault domains, and constructing the mapping relationship of one-to-one correspondence between the first fault domains and the second fault domains by using the disk nodes corresponding to the second fault domains as backup disk nodes include:

determining a block storage mapping relationship through a Hash algorithm, wherein the block storage mapping relationship represents a mapping relationship between each object block in the target storage data and a corresponding target fault domain, and the target fault domain represents a first fault domain into which the object block is to be written; and acquiring the plurality of second fault domains from all disk nodes according to the block storage mapping relationship, and associating the target fault domains with the second fault domains, which are different from each other, to construct the mapping relationship.

In the present application, after the distributed storage cluster receives a request from a client, an ID of a file (i.e., the target storage data) is written. The data packets to which the object blocks in the target storage data are stored are calculated through the Hash algorithm. Then, these object blocks are stored into the main disk nodes in the disk list in the data packet. In the present application, it is necessary to add a backup disk list to a data packet Map to store information about which disk (as the backup disk node) into which the data needs to be written in the event of exceeding the number of fault domains. Meanwhile, a disk list in the original data packet is used as the main disk list. In addition, the disk nodes in the main disk list and the disk nodes in the backup disk list belong to different fault domains. Therefore, according to the mapping relationship between the main and backup disk nodes, only the primary disk list can be read and written and subjected to data backup in the data reading/writing process of services whose number does not exceed that of the fault domains, thereby ensuring that the utilization rate of an effective capacity of the disk is not reduced. In the event of creating the storage pool, the monitoring component invokes the disk allocation algorithm based on a redundancy strategy (e.g., two replicas), calculates the number of data packets in the storage pool, determines that each data packet corresponds to the data disks on which disk nodes, and saves the number ID corresponding to each data disk into the disk list of the data group Map. The number of disks in the list is the same as the redundant number. Therefore, the data reading/writing operations for this data packet are also referred to as the data reading/writing operation for the corresponding disk.

Based on the above embodiment, the generating the data groups list according to the mapping relationship includes:

marking the disk nodes corresponding to the first fault domains as the main disk nodes according to the mapping relationship, and marking the disk nodes corresponding to the second fault domains as the backup disk nodes;

constructing a main disk list and a backup disk list based on identifier information respectively corresponding to the main disk nodes and the backup disk nodes; and generating the data groups list according to the main disk list and the backup disk list.

In the present application, the main disk list and the backup disk list in the data groups list belong to different fault domains. A main/backup relationship between each disk node in the list does not remain unchanged for different data packets. That is, a main disk node in a data packet 1 may be a backup disk node in a data packet 2, while a backup disk node in the data packet 1 is its own main disk node for the data packet 2. Therefore, it is necessary to construct a disk list of each data packet according to the mapping relationship and the identifier information, and then generate the data groups list according to the disk list of each data packet. In the present application, the corresponding main disk list and backup disk list are constructed according to ID information (i.e., identifier information) of each main disk node and backup disk node, and whereby data can be written into the corresponding disk according to the ID information of the disk nodes. Meanwhile, a backFlag tag is added to metadata in the data packet, and whether the data is written to the main disk node or the backup disk node is recorded, wherein the backFlag tag is marked as "false" by default, representing the data being written into the main disk list. Meanwhile, according to this tag, the main/backup disk node corresponding to each data packet may also be determined. That is, in any data packet, the disk into which the data is written is the main disk node when the backFlag tag is "false", and the disk into which the data is written is the backup disk node when the backFlag tag is "true", thereby constructing the main disk list and the backup disk list of the data packet.

Based on the above embodiments, the adjusting the data groups list in the to-be-degraded state based on the disk nodes where no fault occurs currently includes:

determining the disk nodes where no fault occurs currently according to the change in the number of disks in the main disk node at the current time;

adjusting the data groups list based on a data migration minimization principle and according to the number of redundant replicas and the disk nodes where no fault occurs, to obtain the adjusted data groups list; and determining a new data groups list according to the adjusted data groups list and an original data groups list, wherein the original data groups list represents a data groups list before the current adjustment round has been performed.

Figure 4:
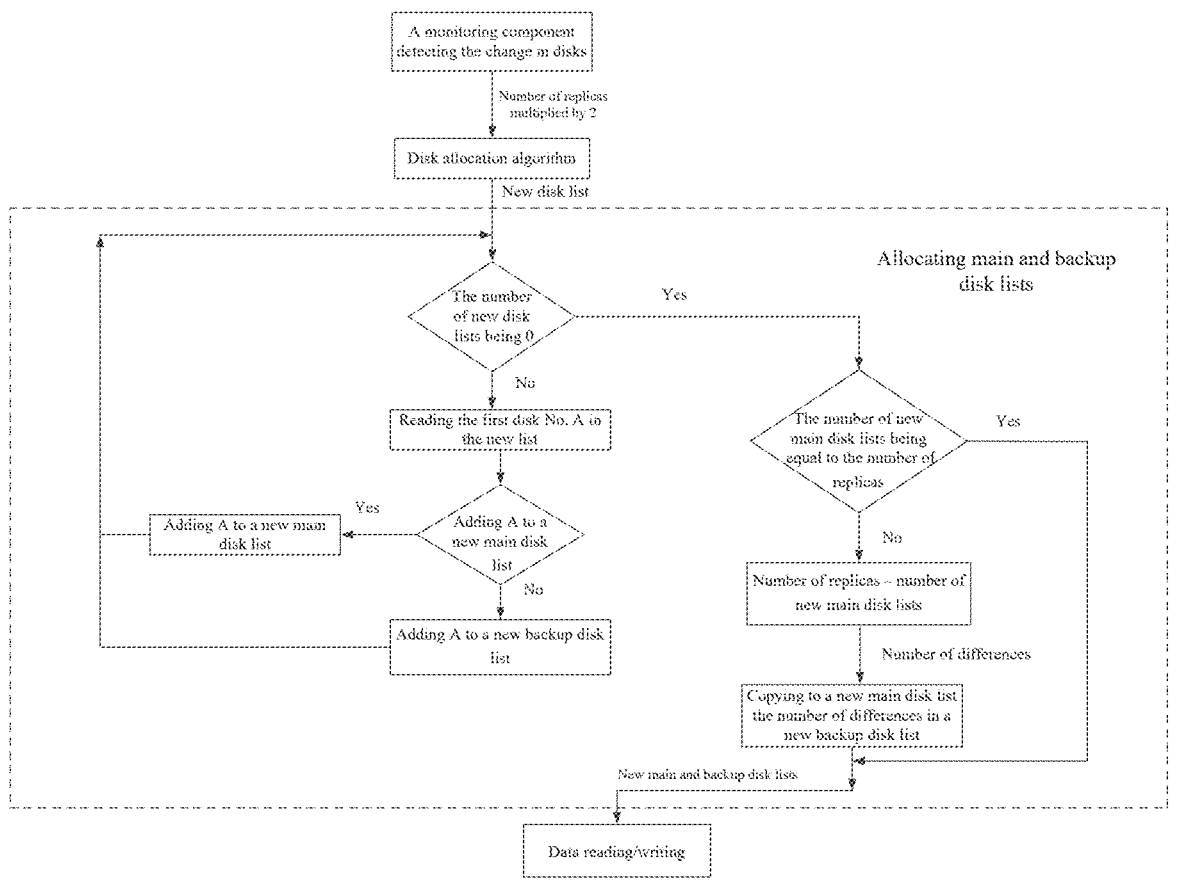
FIG. 4 is a schematic diagram of an adjusting process of disk nodes in data packets provided in the present application.

In the present application, FIG. 4 is a schematic diagram of an adjusting process of disk nodes in data packets provided in the present application. Referring to FIG. 4, when the monitoring component detects the change in disks, that is, when a fault occurs in some nodes and does not exceed the fault domains, or the storage pool undergoes capacity expansion, capacity shrinkage and other operations, the equalization mechanism is started, the disk allocation algorithm is invoked, and the number of replicas to be passed is a value of the number of replicas multiplied by 2. In the present application, the disk members in each data group are readjusted through the disk allocation algorithm according to the number of passed replicas, the corresponding main disk list information in each original data packet, and a data migration minimization principle, and a new disk list in each data packet is output.

Further, after the new disk list in the data packet is acquired, since data exists only in the disk nodes corresponding to the main disk list, in order to ensure no loss and minimum adjustment of data, the corresponding disk IDs in the original primary disk list are still assigned to the new main disk list, and the remaining fault-free disk IDs are reassigned to the corresponding main and backup disk lists (i.e., a new main disk list and a new secondary disk list).

Based on the above embodiments, the determining the new data groups list according to the adjusted data groups list and the original data groups list includes:

if the identifier information of the primary disk node exists in the main disk list of the original data groups list, determining that identifier information of the main disk node is added to a new main disk list, wherein the new main disk list is the main disk list in the adjusted data groups list;

if the identifier information of the main disk nodes does not exist in the main disk list in the original data groups list, determining that the identifier information of the main disk nodes is added to a new backup disk list, wherein the new backup disk list represents the backup disk list in the adjusted data groups list; and generating a new data groups list according to the new main disk list and the new backup disk list.

In the present application, referring to FIG. 4, all disks in the new disk list are traversed first. If the disk ID is in an original main disk list, the disk ID is added to the new main disk list. If the disk ID is not in the original main disk list, the disk ID is added to the new backup disk list. After it is determined that the new disk list has been traversed completely, that is, the number of disks that have not been traversed in the new disk list is 0, if the number of disks in the new main disk list is equal to the number of replicas, it means that the disks in the new main and backup disk lists have been allocated completely.

Based on the above embodiments, the generating the new data groups list according to the new main disk list and the new backup disk list includes:

in a case where the number of disks in the new main disk list is less than the preset redundant replica count, adding the identifier information corresponding to the disk nodes in the new backup disk list to the new main disk list; and in a case where the number of disks in the new main disk list is equal to the preset redundant replica count, determining that the data groups list has been adjusted to obtain the new data groups list.

In the present application, referring to FIG. 4, if the number of disks in the new main disk list is less than the number of replicas, a corresponding number (that is, the number of replicas—the number of disks in the new main disk list) of disk IDs are copied from the new backup disk list to ensure that the number of disks in the new main disk list is equal to the number of replicas. In this case, the number of disks in the new backup list is not necessarily equal to the number of replicas. It is only necessary to ensure that the number of disks in the new backup disk list meets a minimum number of replicas corresponding to the redundancy strategy, otherwise the data will remain unwritable after the fault domains are exceeded.

Based on the above embodiments, the associating the target fault domains with the second fault domains, which are different from each other, to construct the mapping relationship includes:

determining a minimum number of replicas corresponding to the backup disk nodes based on the preset redundant replica count and a preset redundancy mode; and associating the second fault domains corresponding to the minimum number of replicas with the target fault domains.

In the present application, the number of replicas of the backup disk node may be the same as that of the main disk node, or may be set according to the minimum number of replicas. For example, in one embodiment, in a two-replica mode scenario, both the main and backup disk nodes may be set as two data disks. For example, the main disk nodes are set as a data disk 1 and a data disk 11, and the backup disk nodes are set as a data disk 21 and a data disk 31. However, based on the minimum number of replicas, the main disk nodes are set as the data disk 1 and the data disk 11, and the backup disk node is set as the data disk 21 or the data disk 31.

Figure 5:
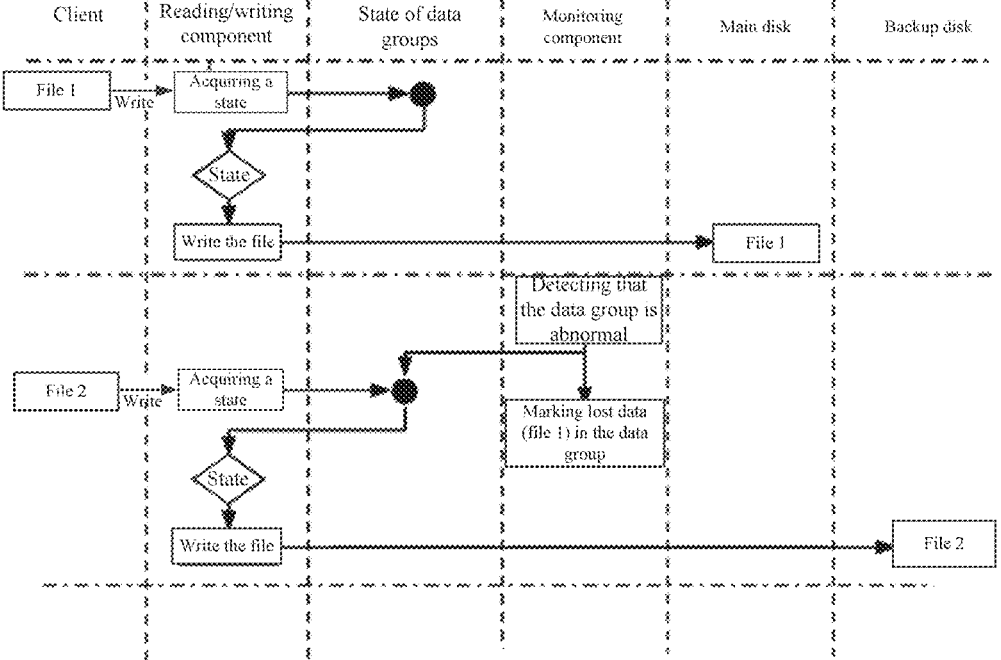
FIG. 5 is a schematic flowchart of a switching process of main and backup disks in a redundancy failure state provided in the present application.

Further, when the monitoring component detects that a fault occurs in all disks in the main disk list in the data packet, or the fault domains where no fault occurs in the main disk list do not meet the minimum number of replicas, the data packet is set as in an abnormal state, and then the entire storage pool is set as in an abnormal state. Therefore, service reading/writing is interrupted, and the storage of video data is stopped. In the case of redundancy failure in the video storage scenario, new video data still needs to be saved to residual disks. FIG. 5 is a schematic flowchart of a switching process of main and backup disks in a redundancy failure state provided in the present application. Referring to FIG. 5, the present application can continue to ensure the continuous write of video data for scenarios after redundancy failure. In some embodiments, after acquiring a write request from a file 1 sent by the client, a reading/writing component acquires a state of the corresponding data packet, and writes the file 1 into the main disk node while determining that the state of the data packet is in a normal or degraded state. After detecting that the disks in the data packet exceed the fault domains, the monitoring component marks the state of the data packet as "abnormal". Meanwhile, a process is started to parse the metadata on the corresponding data packet, and mark the data (i.e., the file 1) written before the abnormal state as an unreadable state. When the write request (to write a file 2) sent by the client is acquired again, the obtained state of the data packet is an abnormal state, and the reading/writing component writes the data into the disks in the backup disk list, so the data is successfully written.

Based on the above embodiment, prior to acquiring the state information of the main disk node, the method further includes:

constructing a disk node writing tag, wherein a value of the disk node writing tag includes writing storage data into the main disk node and writing the storage data into the backup disk node; and after acquiring the state information of the main disk node, the method further includes:

updating the value of the disk node writing tag according to the state information, and thus writing the target storage data into the corresponding disk node according to the updated disk node writing tag; and reading the storage data from the corresponding disk node according to the updated disk node writing tag.

In the present application, it is necessary to add a back-Flag tag to the metadata in the data packet first, and record whether the data is written into the main disk or the backup disk. In some embodiments, in the event of writing data, the file is split into object blocks, a data packet to be written is then calculated according to the file and the object blocks, and whether the state of disks in the corresponding data packet is an abnormal state is determined. If the state is not an abnormal state, the data is written into the disks in the main disk list, and meanwhile, the backFlag tag of the metadata is set as "false". If the state is the abnormal state, the data is written into the disks in the backup disk list, and the backFlag tag of the metadata is set as "true".

Further, when the data needs to be read from the disk nodes, the data packet where the object blocks are located is calculated according to an ID of the file, and then the backFlag tag of the corresponding data among the metadata in the data packet is determined. If the backFlag tag is "false", it means that the data is stored in the disks in the main disk list and read from the main disks. If the tag is "true", the data is read from the backup disks.

Based on the above embodiments, after copying to the main disk node the target storage data, which has been stored in the backup disk node, the method further includes:

deleting the target storage data which has been stored in the backup disk node.

In the present application, after the monitoring component detects that the state of disks in the data group is recovered from an abnormal state to a normal or degraded state, the state of the data packet is set as being normal or degraded.

Meanwhile, a recovery task is started to remove a fault tag from the data that has been previously marked as "fault" and to recover reading/writing. Whether there is in the backup disk newly written data in this data packet (that is, the data to be written into the data packet is written to the backup disk after the main disk nodes exceed the fault domains) is determined, and if not, the recovery is ended. If there is in the backup disk data to be written into the main disks in the data packet, the data whose backFlag is "true" among the metadata is copied to the disks in the main disk list. In addition, the copied backFlag tag of the metadata is changed to "false", the data in the backup disk is deleted synchronously to release the capacity of the disk, without addition increase in the storage capacity of the data.

Based on the above embodiments, the deleting the target storage data which has been stored in the backup disk node includes:

acquiring a transfer duration of backup disk data, wherein the transfer duration of backup disk data represents a duration after the target storage data which has been stored in the backup disk node is copied to the main disk node; and deleting the target storage data which has been stored in the backup disk node after the transfer duration of backup disk data is greater than or equal to a preset deletion duration of backup data.

In the present application, by setting a preset deletion duration of backup data, when the data of the backup disk node has been copied to the main disk node, the data will not be deleted within a certain period of time. During this period of time, if the main disk node operates stably, the main disk is also recovered. In this case, the data stored in the backup disk node is deleted to improve the stability and security of data storage.

Based on the above embodiments, after writing the target storage data into the corresponding backup disk node if the state information indicates the redundancy failure state, the method further includes:

receiving a first input, wherein the first input comprises an operation of reading the target storage data from the backup disk node when it is determined that the state information indicates the redundancy failure state; and acquiring the target storage data which has been stored in the backup disk node in response to the first input.

In the present application, if the main disk node has not yet recovered to the normal state but the data needs to be read, the data can be read directly from the data stored in the backup disk node according to the acquired operation instructions. Therefore, in the event of redundancy failure of a storage node for video data, the data can be written continuously, and also be read before the redundancy failure is removed, thereby promoting the availability of distributed video storage in a fault scenario.

Figure 6:
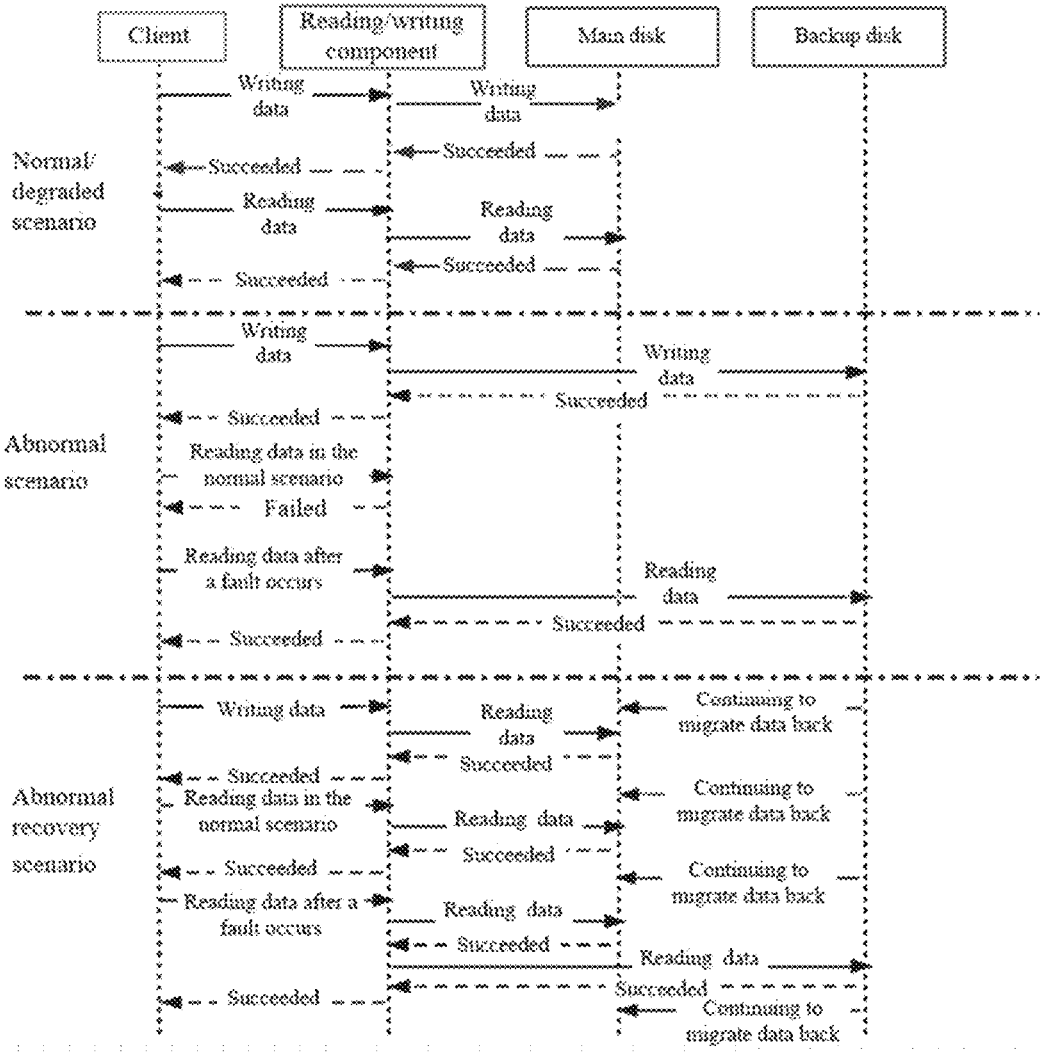
FIG. 6 is a schematic diagram of a whole process of data writing and reading provided in the present application.

FIG. 6 is a schematic diagram of a whole process of data writing/reading provided in the present application. Referring to FIG. 6, in the present application, both data reading/writing are performed on the main disk list for a data reading/writing scenario in the normal state or the degraded state. However, in an abnormal scenario, i.e., the redundancy failure state, the data needs to be written into the backup disk. In addition, data written after a fault occurs is readable, but data written before a fault occurs cannot be read or written. In an abnormal recovery scenario, the new data after recovery is switched to the main disk for writing. At the same time, the data written to the backup disk after the fault occurs is continuously migrated back to the main disk in the form of background tasks, and the data on the backup disk is deleted to free up space. In this case, the data written before and after the fault occurs can be read and written.

The data writing system provided by the present application is described below. The data writing system described below may be cross-referenced with the data writing method described above.

Figure 7:
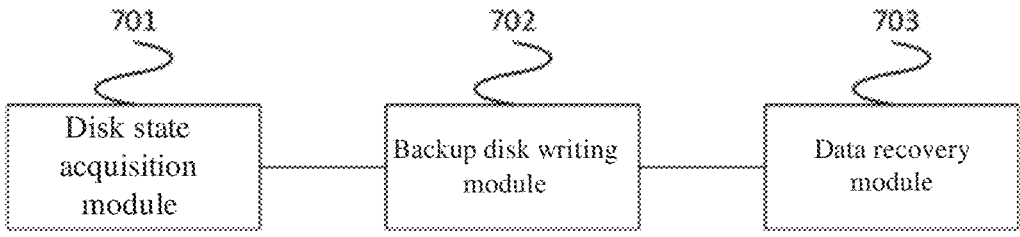
FIG. 7 is a schematic structural diagram of a data writing system provided by the present application.

FIG. 7 is a schematic structural diagram of a data writing system provided by the present application. As shown in FIG. 7, the present application provides a data writing system. The data writing system includes a disk state acquisition module 701, a backup disk writing module 702, and a data recovery module 703. The disk state acquisition module 701 is configured to acquire state information of a main disk node, wherein the main disk node represents a disk node into which target storage data is to be written. The backup disk writing module 702 is configured to, if the state information indicates a redundancy failure state, write the target storage data into a corresponding backup disk node, wherein the backup disk node and the main disk node belong to different fault domains. The data recovery module 703 is configured to, after it is determined that the state information of the main disk node indicates a normal state, copy to the main disk node the target storage data, which has been stored in the backup disk node.

The data writing system provided by the present application can ensure that new video data can still be continuously written and read in a scenario where a fault occurs in a storage node and leads to a redundancy failure, and the number of redundancy fault nodes is increased without reducing the utilization rate of an effective storage capacity, thereby greatly improving the availability of video storage in a fault scenario, ensuring that the residual disk can still be read and written after redundancy failure, and meeting the requirement of services for continuous writing in a video storage scenario.

The system provided by the present application is configured to execute the above-mentioned method embodiments, and the specific processes and details are found in the above-mentioned embodiments, and are not repeated here.

The present application further provides a storage hard disk, which includes the data writing system described in the above embodiment. FIG. 8 is a schematic diagram of a video storage architecture provided by the present application. Referring to FIG. 8, a distributed video-based storage service framework provided by the present application includes a base layer, a video management platform, and a device application. The base layer refers to hardware, an operating system, and a distributed storage cluster. The video management platform is a bridge connecting cameras and video storage, and also supports the viewing of recorded and broadcast videos by clients and AI analysis by third-party application platforms. The device application layer corresponds to different video data application scenarios. The storage hard disk provided by the present application is provided at the base layer. The built-in data writing system can ensure that the distributed storage cluster at the base layer can provide continuous service data storage in a redundancy failure scenario if a fault occurs in a storage node.

The storage hard disk provided by the present application can ensure that new video data can still be continuously written and read in a scenario where a fault occurs in a storage node and leads to a redundancy failure, and the number of redundancy fault nodes is increased without reducing the utilization rate of an effective storage capacity, thereby greatly improving the availability of video storage in a fault scenario, ensuring that the residual disk can still be read and written after redundancy failure, and meeting the requirement of services for continuous writing in a video storage scenario.

FIG. 9 is a schematic structural diagram of an electronic device provided by the present application. As shown in FIG. 9, the electronic device may include: a processor 901, a communications interface 902, a memory 903, and a communication bus 904. The processor 901, the communication interface 902, and the memory 903 complete communication with each other via the communication bus 904. The processor 901 may invoke logical instructions in the memory 903 to perform the data writing method. The method includes: acquiring state information of a main disk node, wherein the main disk node represents a disk node into which target storage data is to be written; if the state information indicates a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node.

The logical instructions in the memory 903, if implemented in the form of a software functional unit and sold or used as a separate product, may be stored in a computer-readable storage medium. Based on this understanding, the technical solutions of the present application in essence (or parts contributed to the prior art) or part of the technical solutions may be embodied in the form of a software product. This computer software product is stored in a storage medium including a plurality of instructions causing a computer device (which may be a personal computer, a server, or a network device, etc.) to perform all or part of the steps of the methods in respective embodiments of the present application. The aforementioned storage media include: a U disk, a portable hard disk, a read-only memory (ROM), a random access memory (RAM), a magnetic disk or an optical disc or other media that can store program codes therein.

In another aspect, the present application further provides a computer program product. The computer program product includes a computer program stored on a non-transient computer-readable storage medium, the computer program including program instructions, which, when being executed by a computer, cause the computer to perform the data writing method provided by the above methods. The method includes: acquiring state information of a main disk node, wherein the main disk node represents a disk node into which target storage data is to be written; if the state information indicates a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node.

In yet another aspect, the present application further provides a non-transient computer-readable storage medium having a computer program stored thereon, the computer program, when being executed by a processor, performing the data writing methods provided by the above embodiments. The method includes: acquiring state information of a main disk node, wherein the main disk node represents a disk node into which target storage data is to be written; if the state information indicates a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node.

The apparatus embodiments described above are merely illustrative, wherein the units described as separate components may or may not be physically separated. The components displayed as units may or may not be physical units, i.e., may be located in one place, or may also be distributed on a plurality of network units. Part or all of the modules can be selected according to actual needs to achieve the object of the solution of this embodiment. Those of ordinary skill in the art can understand and implement the present application without any creative work.

Through the above description to the implementations, it can be clearly understood by a person skilled in the art that various embodiments may be implemented by software and necessary universal hardware platform, and of course may be implemented by hardware. Based on such understandings, the technical solutions of the present application or the part thereof contributing to the prior art may be reflected in the form of a software product. The computer software product is stored in a computer-readable storage medium (e.g., ROM/RAM, a diskette or a compact disk), and includes several instructions to cause a computer device (which may be a mobile phone, a server or a network device, etc.) to perform the method according to each or some of the embodiments of the present application.

It should be eventually noted that: the above examples are merely used to illustrate the technical solutions of the present application, but are not limited thereto. Although the present application is described in detail with reference to the above examples, a person of ordinary skill in the art should understand: the technical solutions described in the foregoing examples may be modified, or some of the technical features may be equivalently replaced. However, these modifications and substitutions do not make the corresponding technical solutions essentially depart from the scope of the technical solutions in the examples of the present application.

What is claimed is:

1. A data writing method, comprising:
acquiring state information of a main disk node, wherein the main disk node represents a disk node into which target storage data is to be written;
in response to the state information indicating a redundancy failure state, writing the target storage data into a corresponding backup disk node, wherein the backup disk node and the main disk node belong to different fault domains; and
after it is determined that the state information of the main disk node indicates a normal state, copying to the main disk node the target storage data, which has been stored in the backup disk node, wherein, prior to the acquiring the state information of the main disk node, the method further comprises:
determining a plurality of corresponding first fault domains from all disk nodes according to a preset redundant replica count and preset data groups, wherein the first fault domains are main disk nodes into which object blocks are to be written, and the object blocks are obtained by splitting the target storage data based on the preset data groups;
acquiring a plurality of second fault domains, and constructing a mapping relationship of one-to-one correspondence between the first fault domains and the second fault domains by using the disk nodes corresponding to the second fault domains as backup disk nodes; and
generating a data groups list according to the mapping relationship, wherein the first fault domain and the second fault domain in each data packet in the data groups list are different fault domains; and
prior to the writing the target storage data into the corresponding backup disk node, the method further comprises:
determining the corresponding backup disk node according to the data groups list when the main disk node is in the redundancy failure state.

2. The data writing method according to claim 1, wherein, after the acquiring the state information of the main disk node, the method further comprises:
acquiring state information of fault domains, wherein the state information of the fault domains represents state information of all fault domains corresponding to the main disk node;
determining a number of fault disk nodes in each of the data packets at a current time according to the state information of the fault domains; and
determining that the data packets are in the redundancy failure state in a case where the number of fault disk nodes is greater than a preset fault threshold.

3. The data writing method according to claim 2, further comprising:
determining that the data packets are in a to-be-degraded state in a case where the number of fault disk nodes is less than or equal to the preset fault threshold; and
adjusting the data groups list in the to-be-degraded state based on the disk nodes where no fault occurs currently to yield an adjusted data groups list.

4. The data writing method according to claim 2, further comprising:
in response to the number of fault disk nodes being zero, determining that the data packets are in the normal state, and writing the target storage data to the main disk node.

5. The data writing method according to claim 3, wherein, after the adjusting the data groups list in the to-be-degraded state based on the disk nodes where no fault occurs currently to yield an adjusted data groups list, the method further comprises:
writing the target storage data into the main disk node in the adjusted data groups list.

6. The data writing method according to claim 3, wherein the acquiring the plurality of second fault domains, and constructing the mapping relationship of one-to-one correspondence between the first fault domains and the second fault domains by using the disk nodes corresponding to the second fault domains as backup disk nodes, comprise:
determining a block storage mapping relationship through a Hash algorithm, wherein the block storage mapping relationship represents a mapping relationship between each object block in the target storage data and a corresponding target fault domain, and the target fault domain represents a first fault domain into which the object block is to be written; and
acquiring the plurality of second fault domains from all disk nodes according to the block storage mapping relationship, and associating the target fault domains with the second fault domains, which are different from each other, to construct the mapping relationship.

7. The data writing method according to claim 6, wherein the generating the data groups list according to the mapping relationship comprises:

marking the disk nodes corresponding to the first fault domains as the main disk nodes according to the mapping relationship, and marking the disk nodes corresponding to the second fault domains as the backup disk nodes;

constructing a main disk list and a backup disk list based on identifier information respectively corresponding to the main disk nodes and the backup disk nodes; and generating the data groups list according to the main disk list and the backup disk list.

8. The data writing method according to claim 7, wherein the adjusting the data groups list in the to-be-degraded state based on the disk nodes where no fault occurs currently to yield an adjusted data groups list comprises:

determining the disk nodes where no fault occurs currently according to a change in a number of disks in the main disk node at the current time;

adjusting the data groups list based on a data migration minimization principle and according to a number of redundant replicas and the disk nodes where no fault occurs, to obtain the adjusted data groups list; and determining a new data groups list according to the adjusted data groups list and an original data groups list, wherein the original data groups list represents a data groups list before a current adjustment round has been performed.

9. The data writing method according to claim 8, wherein the determining the new data groups list according to the adjusted data groups list and the original data groups list comprises:

in response to the identifier information of the main disk nodes existing in the main disk list in the original data groups list, determining that the identifier information of the main disk nodes is added to a new main disk list, wherein the new main disk list represents the main disk list in the adjusted data groups list;

in response to the identifier information of the main disk nodes not existing in the main disk list in the original data groups list, determining that the identifier information of the main disk nodes is added to a new backup disk list, wherein the new backup disk list represents the backup disk list in the adjusted data groups list; and generating the new data groups list according to the new main disk list and the new backup disk list.

10. The data writing method according to claim 9, wherein the generating the new data groups list according to the new main disk list and the new backup disk list comprises:

in a case where the number of disks in the new main disk list is less than the preset redundant replica count, adding the identifier information corresponding to the disk nodes in the new backup disk list to the new main disk list; and in a case where the number of disks in the new main disk list is equal to the preset redundant replica count, determining that the data groups list has been adjusted to obtain the new data groups list.

11. The data writing method according to claim 6, wherein the associating the target fault domains with the second fault domains, which are different from each other, to construct the mapping relationship comprises:

determining a minimum number of replicas corresponding to the backup disk nodes based on the preset redundant replica count and a preset redundancy mode; and associating the second fault domains corresponding to the minimum number of replicas with the target fault domains.

12. The data writing method according to claim 1, wherein, prior to the acquiring the state information of the main disk node, the method further comprises:

constructing a disk node writing tag, wherein a value of the disk node writing tag comprises writing storage data into the main disk node and writing the storage data into the backup disk node; and after the acquiring the state information of the main disk node, the method further comprises:

updating the value of the disk node writing tag according to the state information to yield an updated disk node writing tag, and thus writing the target storage data into the corresponding disk node according to the updated disk node writing tag; and reading the storage data from the corresponding disk node according to the updated disk node writing tag.

13. The data writing method according to claim 1, wherein, after the copying to the main disk node the target storage data, which has been stored in the backup disk node, the method further comprises:

deleting the target storage data which has been stored in the backup disk node.

14. The data writing method according to claim 13, wherein, after the deleting the target storage data which has been stored in the backup disk node, the method comprises:

acquiring a transfer duration of backup disk data, wherein the transfer duration of backup disk data represents a duration after the target storage data which has been stored in the backup disk node is copied to the main disk node; and deleting the target storage data which has been stored in the backup disk node after the transfer duration of backup disk data is greater than or equal to a preset deletion duration of backup data.

15. The data writing method according to claim 1 wherein, after the writing the target storage data into the corresponding backup disk node in response to the state information indicating the redundancy failure state, the method further comprises:

receiving a first input, wherein the first input comprises an operation of reading the target storage data from the backup disk node when it is determined that the state information indicates the redundancy failure state; and acquiring the target storage data which has been stored in the backup disk node in response to the first input.

16. An electronic device, comprising a memory, a processor, and a computer program that is stored in the memory and operable on the processor, wherein the processor is configured to implement a data writing method, comprising:

acquiring state information of a main disk node, wherein the main disk node represents a disk node into which target storage data is to be written;

in response to the state information indicating a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node, wherein, prior to the acquiring the state information of the main disk node, the method further comprises:

determining a plurality of corresponding first fault domains from all disk nodes according to a preset redundant replica count and preset data groups, wherein the first fault domains are main disk nodes into which object blocks are to be written, and the object blocks are obtained by splitting the target storage data based on the preset data groups;

acquiring a plurality of second fault domains, and constructing a mapping relationship of one-to-one correspondence between the first fault domains and the second fault domains by using the disk nodes corresponding to the second fault domains as backup disk nodes; and generating a data groups list according to the mapping relationship, wherein the first fault domain and the second fault domain in each data packet in the data groups list are different fault domains; and prior to the writing the target storage data into the corresponding backup disk node, the method further comprises:

determining the corresponding backup disk node according to the data groups list when the main disk node is in the redundancy failure state.

17. A non-transient computer-readable storage medium, having a computer program stored thereon, wherein the computer program, when being executed by a processor, implements a data writing method, comprising:

acquiring state information of a main disk node, wherein the main disk node represents a disk node into which target storage data is to be written;

in response to the state information indicating a redundancy failure state, writing the target storage data into a corresponding backup disk node, wherein the backup disk node and the main disk node belong to different fault domains; and after it is determined that the state information of the main disk node indicates a normal state, copying to the main disk node the target storage data, which has been stored in the backup disk node, wherein, prior to the acquiring the state information of the main disk node, the method further comprises:

determining a plurality of corresponding first fault domains from all disk nodes according to a preset redundant replica count and preset data groups, wherein the first fault domains are main disk nodes into which object blocks are to be written, and the object blocks are obtained by splitting the target storage data based on the preset data groups;

acquiring a plurality of second fault domains, and constructing a mapping relationship of one-to-one correspondence between the first fault domains and the second fault domains by using the disk nodes corresponding to the second fault domains as backup disk nodes; and generating a data groups list according to the mapping relationship, wherein the first fault domain and the second fault domain in each data packet in the data groups list are different fault domains; and prior to the writing the target storage data into the corresponding backup disk node, the method further comprises:

determining the corresponding backup disk node according to the data groups list when the main disk node is in the redundancy failure state.

18. A storage hard disk, comprising the electronic device according to claim 16.

19. The electronic device according to claim 16, wherein the method further comprises:

acquiring state information of fault domains, wherein the state information of the fault domains represents state information of all fault domains corresponding to the main disk node;

determining a number of fault disk nodes in each of the data packets at a current time according to the state information of the fault domains; and determining that the data packets are in the redundancy failure state in a case where the number of fault disk nodes is greater than a preset fault threshold.

20. The electronic device according to claim 19, wherein the method further comprises:

determining that the data packets are in a to-be-degraded state in a case where the number of fault disk nodes is less than or equal to the preset fault threshold; and adjusting the data groups list in the to-be-degraded state based on the disk nodes where no fault occurs currently to yield an adjusted data groups list.

* * * * *